United States Patent [19]

Yokosuka

[11] 3,916,819

[45] Nov. 4, 1975

[54] CHANNEL INDICATOR DEVICE FOR TELEVISION RECEIVING SETS

[75] Inventor: Akira Yokosuka, Fujisawa, Japan

[73] Assignee: Matsushita Electric Industrial Co., Kadoma, Japan

[22] Filed: Dec. 27, 1972

[21] Appl. No.: 318,982

[30] Foreign Application Priority Data

Dec. 28, 1971 Japan .............................. 46-359

[52] U.S. Cl............... 116/124.1; 74/10 R; 325/464; 334/86

[51] Int. Cl............................................... H03j 1/02

[58] Field of Search........... 116/124.1, 124.2, 124.3, 116/124.4, 129 C, 129 G; 74/10 R, 10.22, 10.39, 10.7; 325/464; 334/86

[56] References Cited

UNITED STATES PATENTS

| | | | |
|---|---|---|---|
| 1,450,919 | 4/1923 | Harris | 116/129 C |
| 2,144,325 | 1/1939 | Buchardt | 116/129 C X |
| 2,400,553 | 5/1946 | Howard | 116/129 C X |
| 2,575,856 | 11/1951 | Ware | 116/124.4 |
| 2,712,584 | 7/1955 | Pantages | 116/129 C |
| 3,085,199 | 4/1963 | Foss | 116/124.1 R X |

*Primary Examiner*—Louis J. Capozi
*Attorney, Agent, or Firm*—Stevens, Davis, Miller and Mosher

[57] ABSTRACT

A channel indicator device for television receiving sets, in which a disc having denoted on the front face thereof channel numbers of both VHF and UHF bands in series in a spiral arrangement is operatively connected with a tuner driving shaft to be driven thereby in such a manner that it makes concurrently a rotary motion and a linear motion in a vertical direction, so that the chanel number selected by a tuner may be indicated through a channel indication window provided in the cabinet of the television receiving set.

1 Claim, 10 Drawing Figures

CHANNEL INDICATOR DEVICE FOR TELEVISION RECEIVING SETS

This invention relates to a channel indicating device for television receiving sets.

Recently, the number of UHF telecasting stations is increasing and 50–70 stations have already been established or planned to be established in Japan. When it is desired to use in television receiving sets for receiving telecasting from such UHF stations a detent-type tuner similar to the tuner used in television receiving sets for receiving telecasting from VHF stations, a channel indicating device having a large indication capacity is required. Namely, conventional channel indicating devices for indicating channels of VHF band have been of the type comprising a rotary disc having a series of channel numbers denoted thereon in a circular arrangement and hence been small in indication capacity. Therefore, this type of indicating device cannot be used for the indication of channel numbers of UHF band. If it is desired to use such indicating device by all means, the disc will become extremely large in diameter, rending itself unserviceable for practical use.

The present invention contemplates the elimination of such disadvantage and has for its object the provision of a channel indicating device which is large in indication capacity and yet small in size.

Another object of the invention is to provide a channel indicating device which comprises a simple mechanism by which a channel indicating disc or dial is moved smoothly in a vertical direction while rotating round its own axis.

The present invention will be described by way of example hereunder with reference to the accompanying drawings, in which.

Figure 4A:
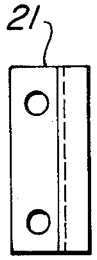
Figure 4B:
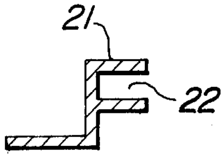
Figure 5:
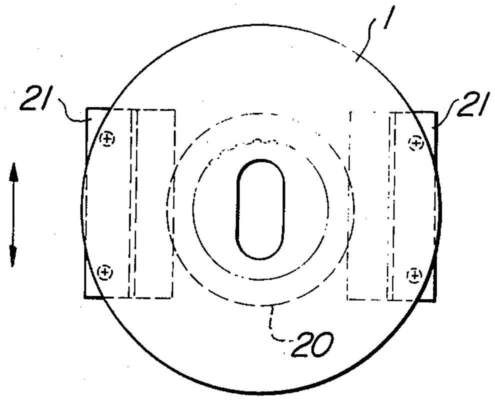
Figure 6:
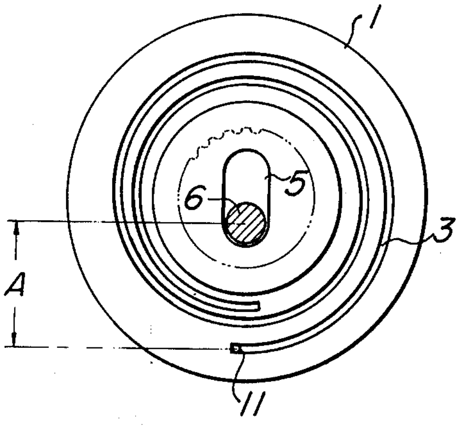
Figure 7:
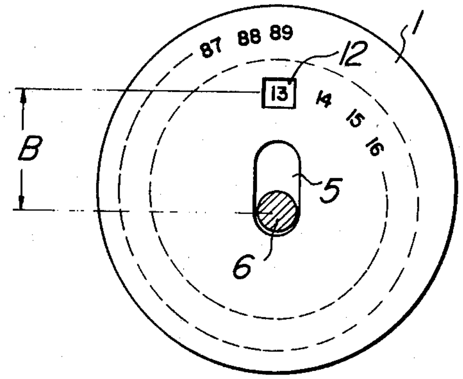
Figure 8:
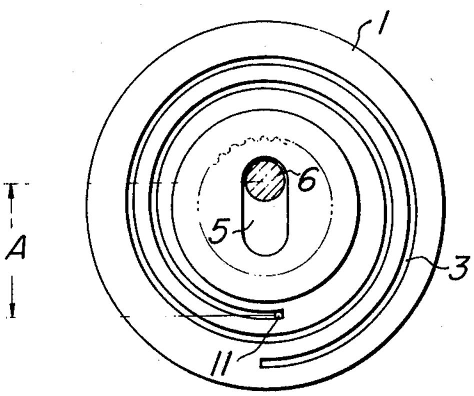
Figure 9:
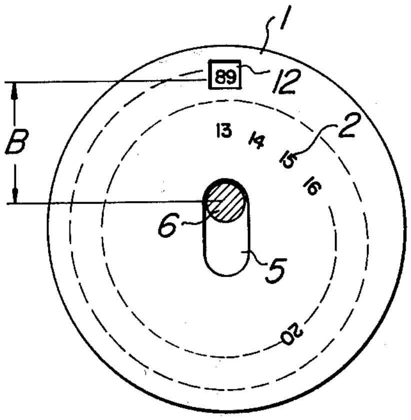

FIG. 4*a* is a front view of a guide member and FIG. 4*b* is a cross-sectional view of the guide member;

FIG. 5 is a front view showing the connection of a collar engaging the guide member;

FIGS. 6 and 7 are backside and front views showing the channel indicating plate positioned at its uppermost position; and FIGS. 8 and 9 are backside and front views showing the channel indicating plate positioned at its lowermost position.

Figure 2:
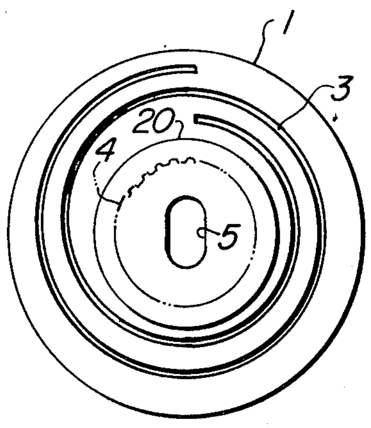
FIG. 2 is a rear elevational view of the channel indicating disc.
Figure 1:
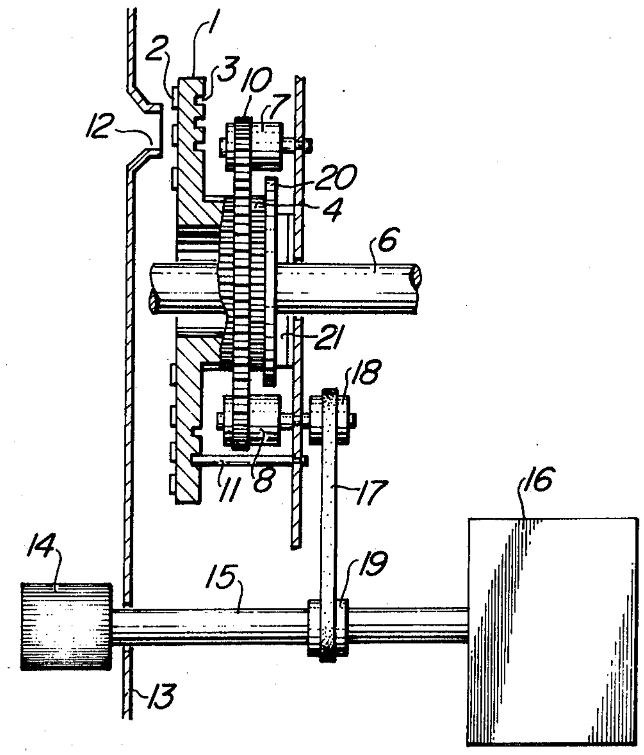
FIG. 1 is a side elevational view, partially in section, of an embodiment of the channel indicating device according to the invention.
Figure 3:
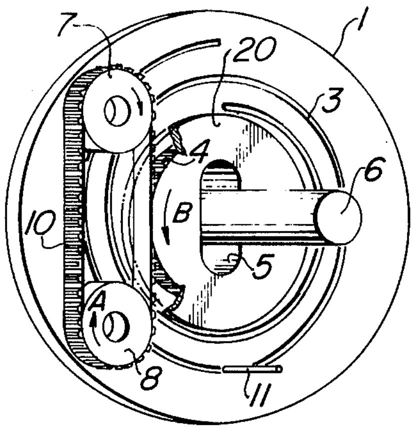
FIG. 3 is a perspective view of the channel indicating mechanism as viewed from the back side thereof.

In FIG. 1, reference numeral 1 generally indicates a channel indicating member in the form of a disc or dial which has denoted on the front face thereof a large number of the channel numbers 2 of UHF stations arranged in series in a spiral configuration. This channel indicating disc 1 is provided with a spiral groove 3 on the backside thereof as shown in FIGS. 2 and 3. A gear 4 is provided at the center of the backside of the indicating disc 1 integrally therewith. A vertically elongated hole 5 is formed through the gear 4 and indicating disc 1, and a shaft 6 is extended through hole 5, shaft 6 being supported by a bracket 9. Also supported on the bracket 9 are rotatable drums 7, 8, and a driving belt 10 having gear teeth on the outer surface thereof is engaged around said drums 7, 8, with the gear teeth on belt 10 meshing with the gear 4. Reference numeral 11 designates a pin for causing vertical movement of the indicating disc 1, and one end of pin 11 is fixed to the bracket 9 and the other end thereof is slidably received in the spiral groove 3. Reference numeral 12 designates a channel indication window provided in the cabinet 13 of a television receiving set at a location in front of the channel indicating disc 1; 14 is a tuner operating knob fixedly mounted on the outwardly projecting end of a tuner shaft 15; and 16 a UHF tuner. The rotation of the tuner shaft 15 is transmitted to the drum 8 through a pulley fixedly mounted on tuner shaft 15, a pulley 18 connected to the drum 8 and a belt 17 engaged around said pulleys 18, 19.

A collar 20 is provided on the backside of indicating disc 1 surrounding the axis of rotation of the disc. Guide means 21 having a recess 22 (FIGS. 4a and 4b) engage collar 20 as shown in FIG. 5 thereby providing support for disc 1 and guiding it when it moves downwardly and upwardly due to its rotation.

The channel indicating device of the invention constructed as described above operates in the following manner: Namely, when it is desired to change the UHF channel, the knob 14 is turned to change the position of the UHF tuner 16. In this case, the rotation of the shaft 15 is transmitted to the drum 8 through the pulley 19, the belt 17 and the pulley 18, to rotate drum 8. When the drum 8 rotates in the direction of the arrow A shown in FIG. 3, the belt 10 is driven and the gear 4 is rotated in the direction of the arrow B. At the same time, the indicating disc 1 also rotates, so that the pin 11 makes a relative sliding movement in the groove 3, slowly lifting indicating disc 1. Thus, it will be understood that the UHF channel numbers denoted on the indicating disc 1 are shown one after another through the indicating window 12 as the knob 14 is turned.

When the drum 8 rotates in the opposite direction incident to the rotation of the knob 14, the linear portion of the belt 10 in meshing engagement with the gear 4 moves upwardly, causing the gear 4 to rotate in a direction opposite to the direction of the arrow B, so that the indicating disc 1 is also rotated and gradually moved down by the action of the pin 11 slidably received in the groove 3. In the manner described, the UHF channel numbers are indicated one at a time through the indication window 12.

Referring to FIG. 6, the pitch (A) is constant since the positions of shaft 6 and positioning pin 11 are fixed. Rotation of the gear 4 rotates the member 1 along the spiral groove 3 thereby moving member 1 upwardly or downwardly. The pitch B between the centerline of shaft 6 and the numeral 13 is also constant. Similarly, as shown in FIGS. 8 and 9, the pitches A and B are also constant.

In the embodiment described and illustrated herein, the belt 17 and pulleys 18, 19 are used for transmitting the rotation of the shaft 15 to the drum 8, but it should be understood that a gear train may be used for the same purpose, in lieu of the belt and pulleys.

It should also be understood that, according to the construction of the channel indicating device of the invention, it is possible, because of the large indication capacity, to indicate channel numbers of both UHF and VHF bands through one and the same indication window when a tuner capable of receiving the channels of both UHF and VHF bands is used in lieu of the UHF tuner 16.

What is claimed is:

1. A channel indicating device for a television receiver having a channel selecting tuner comprising a. a circular indicating member having channel members arranged in a spiral configuration on the front face thereof, a spiral groove on the backside thereof, and an elongated hole through its center of rotation;

b. a collar provided on said indicating member surrounding said center of rotation;

c. a fixed positioning pin slidably engaging the spiral groove in said indicating member;

d. a first shaft extending through the elongated hole in said indicating member;

e. a second shaft connected to said channel selecting tuner;

f. means for operatively connecting said indicating member to said second shaft, said means comprising:

1. a gear integrally secured to the center of the backside of said indicating member,
2. a pair of rotary drums operatively connected to said second shaft, and
3. a driving belt having gear teeth on the outer surface thereof engaged around said pair of rotary drums, the teeth on said belt meshing with said gear; and g. guiding means having a recess therein for receiving said collar, the center of rotation of said indicating member being translated linearly as said second shaft is rotated, said indicating member being guided by said guiding means.

* * * * *